(12) United States Patent
Wodtke et al.

(10) Patent No.: US 8,057,336 B2
(45) Date of Patent: Nov. 15, 2011

(54) GUIDE DEVICE FOR AN ENDLESS TORQUE-TRANSMITTING MEANS, AND MOLD FOR PRODUCING A GUIDE DEVICE

(75) Inventors: Hans-Walter Wodtke, Hennef (DE); Thomas Krauss, Lingen (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 374 days.

(21) Appl. No.: 11/638,096

(22) Filed: Dec. 12, 2006

(65) Prior Publication Data
US 2007/0190830 A1 Aug. 16, 2007

Related U.S. Application Data

(60) Provisional application No. 60/749,759, filed on Dec. 13, 2005.

(51) Int. Cl.
*B62J 13/00* (2006.01)
*F16H 63/00* (2006.01)
*F16H 7/08* (2006.01)

(52) U.S. Cl. .......... 474/145; 474/146; 474/18; 474/111

(58) Field of Classification Search .............. 474/1–147; 425/3
See application file for complete search history.

(56) References Cited

U.S. PATENT DOCUMENTS

| | | | | |
|---|---|---|---|---|
| 3,696,685 A | * | 10/1972 | Lampredi | 474/161 |
| 4,826,468 A | * | 5/1989 | Friedrichs | 474/101 |
| 4,842,570 A | * | 6/1989 | Niebling | 474/118 |
| 6,302,817 B1 | | 10/2001 | Maute | 474/144 |
| 6,435,994 B1 | | 8/2002 | Friedmann et al. | 474/145 |
| 2002/0004433 A1 | | 1/2002 | Fujiwara et al. | 474/111 |
| 2005/0277500 A1 | | 12/2005 | Bitzer et al. | 474/1 |

FOREIGN PATENT DOCUMENTS

| | | |
|---|---|---|
| DE | 35 25 746 A1 | 1/1987 |
| DE | 102 03 941 A1 | 8/2002 |
| EP | 0 280 365 A2 | 8/1988 |
| EP | 1 000 880 A1 | 5/2000 |
| GB | 2 217 807 A | 11/1989 |
| JP | 2001-349396 A | 12/2001 |
| WO | WO 03/087846 A2 | 10/2003 |

\* cited by examiner

*Primary Examiner* — Michael Mansen
*Assistant Examiner* — Robert Reese
(74) *Attorney, Agent, or Firm* — Alfred J. Mangels

(57) ABSTRACT

A guide device for an endless torque-transmitting member. The guide device includes at least two corresponding guide tongues between which the endless torque-transmitting member is at least partially guided. The guide tongues are held at a predetermined distance from each other by a connection region. The distance between the guide tongues is maintained substantially constant when there is a temperature change by the use in the guide device of materials having different coefficients of thermal expansion. A mold for producing a guide device is disclosed and includes two corresponding mold halves, where at least one connecting component formed from a material having a lower coefficient of thermal expansion than that of the guide tongues is held in one mold half.

14 Claims, 2 Drawing Sheets

GUIDE DEVICE FOR AN ENDLESS TORQUE-TRANSMITTING MEANS, AND MOLD FOR PRODUCING A GUIDE DEVICE

BACKGROUND OF THE INVENTION

1. Field of the Invention

The present invention relates to a guide device for guiding an endless torque-transmitting means. The guide device includes at least two corresponding guide tongues, between which the endless torque-transmitting means is at least partially guided, the guide tongues being held at a predetermined distance from each other by means of a connection region. The invention also relates to a mold for producing a guide device for an endless torque-transmitting means, and including two corresponding mold halves.

2. Description of the Related Art

A guide device is known in the automotive engineering field for guiding or receiving an endless torque-transmitting means for a transmission, in particular for a belt-driven conical-pulley transmission (CVT transmission). In the belt-driven conical-pulley transmission the endless torque-transmitting means is used to transmit torque between two pairs of pulleys, the endless torque-transmitting means being, for example, a chain or a belt. To fulfill desired acoustic requirements it is necessary to reduce the so-called strand vibrations of the endless torque-transmitting means, in order thereby also to lower the noise level. For that purpose, a receiving rail is provided as a guide device to partially receive the endless torque-transmitting means. The receiving rail includes corresponding tongues, between which the endless torque-transmitting means is guided.

It has been found that the dimensions of a chain-receiving guide channel formed between the two corresponding tongues can change due to temperature fluctuations. As a result, it is possible for too large a play to occur between the endless torque-transmitting means and the guide surfaces of the chain-receiving channel, so that the latter can no longer reduce the strand vibrations adequately. Hence the acoustical requirements are no longer fulfilled. In particular, at low temperatures jamming of the endless torque-transmitting means can occur, and thus undesired high wear.

Thus, an object of the present invention is to provide a guide device of the type identified above that is designed so that the distance between the guide tongues can be held substantially constant, independent of temperature fluctuations.

SUMMARY OF THE INVENTION

The object is achieved by a guide device for an endless torque-transmitting means, wherein the guide device includes at least two corresponding guide tongues between which the endless torque-transmitting means is at least partially guided. The guide tongues are held at a predetermined distance by means of a connection region. In accordance with the invention provision is made so that even with substantial temperature fluctuations the distance between the guide tongues is substantially constant because of the use of materials having different coefficients of thermal expansion.

In that manner, both jamming and high wear at low temperatures, and lack of damping of the vibrations of the endless torque-transmitting means at high temperatures, can be prevented in an advantageous way with the guide device in accordance with the invention. Through the use of materials having different coefficients of thermal expansion, the expansion or contraction of the one material can be compensated for by the other material. That ensures a nearly constant distance overall between the two guide tongues in the guide device in accordance with the invention, so that the endless torque-transmitting means is guided optimally independent of temperature fluctuations. Additionally, possible vibrations of the endless torque-transmitting means are reduced in such a way that high acoustical demands are fulfilled by the guide device in accordance with the invention.

One possible embodiment of the present invention can provide that essentially a plastic with a high coefficient of thermal expansion is provided as the material of the guide device, wherein a connection region of the guide device includes at least one component made of a material having a low coefficient of thermal expansion. It is possible, for example, for the connection region to be made in part of a material having a lower coefficient of thermal expansion than the material used otherwise for the guide device.

The advantages described above can be achieved through the chosen combination of the different materials in the guide device in accordance with the invention.

Other combinations of materials can also be used in order to achieve the desired effect. By preference, however, the guide tongues and also the connection region are made predominantly of a plastic with a relatively high coefficient of thermal expansion, because such a material provides optimal sliding or guiding properties for the endless torque-transmitting means. For example, it is possible to employ as the pair of materials in that connection a high-temperature polymer such as polyamide PA 46, or the like, and as the material having a relatively low coefficient of thermal expansion CK 75 steel, or the like. It is also possible, however, for the guide device to be made, for example, of steel, aluminum, or glass-fiber-reinforced plastic with a foamed rubbing surface, and for the connecting component, or insert, to be made of a material having a different coefficient of thermal expansion. It is also conceivable for connections between the guide tongues to be provided as a connection region, with the connections being formed by screws, pins, rivets, or other connecting means having a low coefficient of thermal expansion.

Independent of the choice of materials to be used, and in accordance with another embodiment of the present invention, provision can be made for the connecting component to be at least partially integrated into the connection region of the guide device. In that embodiment, the connecting component can be formed in the connection region in conjunction with the production of the guide device, for example.

Another advantageous embodiment of the present invention can provide for the connecting component to be detachably connected to the guide device. In that embodiment, the connecting component can also be attached to the guide device after the latter has been produced. The attachment can be accomplished by a form-locking connection, or the like, for example a form-locking connection, to the connection region of the guide device. Other attachment options are also possible.

In conjunction with a next possible embodiment of the present invention, the connecting component can be in the form of a substantially U-shaped metal strap. Preferably, the metal strap can be made for example of CK 75 steel, which has a relatively low coefficient of thermal expansion. Other arrangements of the connecting component are also possible. The U-shaped configuration is used by preference, however, if the connecting component is to be fitted into the channel-shaped connection region as an insert. Preferably, the dimension of the base of the U-shaped metal strap can correspond substantially to the dimension of the connection region, in order to achieve optimal compensation for the thermal expansions. To ensure optimal connection to the guide tongues, the legs of the U-shaped metal strap can have crossing regions, which, in accordance with a next refinement, are molded into the respective associated guide tongue. In that way, adequate rigidity of the guide device is also ensured.

In accordance with a further refinement of the invention, the guide device in accordance with the invention can have a substantially channel-shaped connection region to hold the corresponding guide tongues at a predetermined distance. The guide tongues thereby function as guide rails or sliding rails. Because of the channel-shaped connection region, the guide devices have a substantially U-shaped cross section. Other structural configurations are also conceivable.

To ensure optimal distribution of forces at the connection region, the substantially channel-shaped connection region can preferably have an oval-shaped recess. The elliptical shape of the recess provides a favorable force pattern in the region of the connecting channel, and it prevents the formation of stresses when there are large temperature fluctuations. As a result, cracks or other damage to the connection region are prevented.

The guide device in accordance with the invention can be utilized with various endless torque-transmitting means. For example, the guide device can be used with normal chain drives, with chains for a CVT transmission, with toothed chain drives, and the like.

The object of the invention is also achieved by a mold for producing a guide device for guiding an endless torque-transmitting means, including two corresponding mold halves. In accordance with the invention, the connecting component made of a material having a low coefficient of thermal expansion is held in at least one mold half. If the guide device is made from a plastic material, for example, provision can be made for the connecting component to be held in one of the mold halves to produce the guide device. That makes it possible to ensure the correct position of the connecting component at all times during the injection process. A great variety of types of holders can be used for that purpose.

In accordance with a refinement of the present invention, provision can be made for the mold half to have at least one magnet, or the like, to hold the connecting component. In order to ensure the correct alignment of the connecting component when producing the guide device, the mold half can have, for example, positioning pins, or the like, which align the connecting component to the mold in the desired way.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
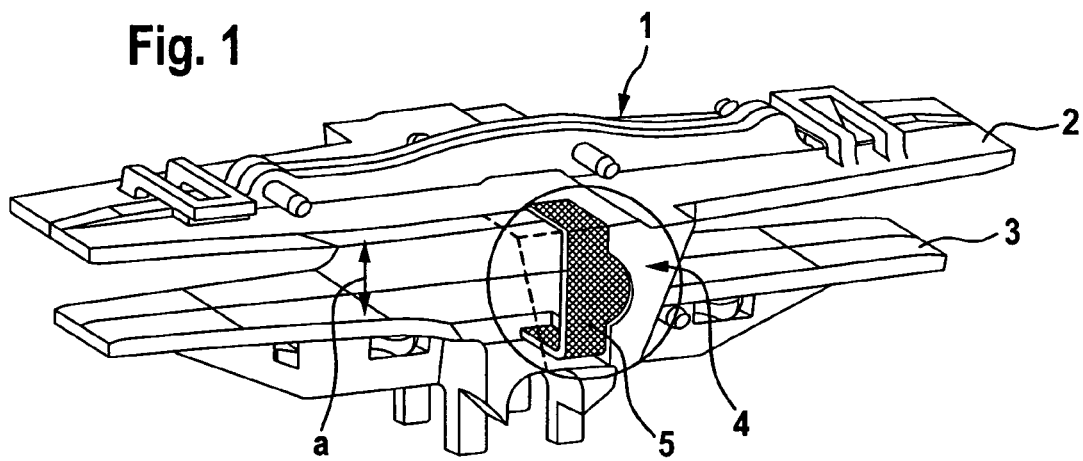
FIG. 1 is a perspective view of an embodiment of a guide device in accordance with the invention for guiding an endless torque-transmitting means.

FIG. 1 shows a perspective view of an embodiment of a guide device in accordance with the invention for guiding an endless torque-transmitting means (not shown).

The FIG. 1 embodiment includes a guide device 1 that has at least two corresponding guide tongues 2, 3, between which an endless torque-transmitting means is at least partially guided. The two guide tongues 2, 3, configured as sliding rails, form a guide channel for the endless torque-transmitting means and to reduce vibrations of the endless torque-transmitting means. The two guide tongues 2, 3 are maintained at a predetermined distance a by means of a common connection region 4. Connection region 4 is shown broken away in FIG. 1, or in a partial view, so that an integrated connecting component 5 is visible. That depiction is identified in FIG. 1 by a circle. Connection region 4 is of substantially channel-like form and with a substantially trapezoidal base surface. In that exemplary embodiment of the present invention, guide device 1 is made of a high-temperature polymer, namely polyamide PA 46. The polyamide PA 46 material has a relatively high coefficient of thermal expansion.

In accordance with the invention, provision is made for the guide device to be made of materials having different coefficients of thermal expansion, in order to keep the distance a between the guide tongues 2, 3 substantially constant even when there are temperature changes. Thus, combining the materials having different coefficients of thermal expansion makes it possible to achieve compensation for temperature differences by virtue of the different thermal expansions of the materials. As a consequence, the guide device in accordance with the invention can ensure a substantially constant guiding arrangement for the endless torque-transmitting means, even at different ambient temperatures.

In the exemplary embodiment the guide tongues 2, 3 and the connection region 4 are made of plastic having a high coefficient of thermal expansion. In addition, connection region 4 has the connecting component 5 shown in FIG. 1 made of a material having a lower coefficient of thermal expansion, such as, for example, CK75 steel. The connecting component is configured as can be seen from FIG. 2 as a substantially U-shaped metal strap and is molded into the connection region 4, whose cross-section is also substantially U-shaped.

Figure 2:
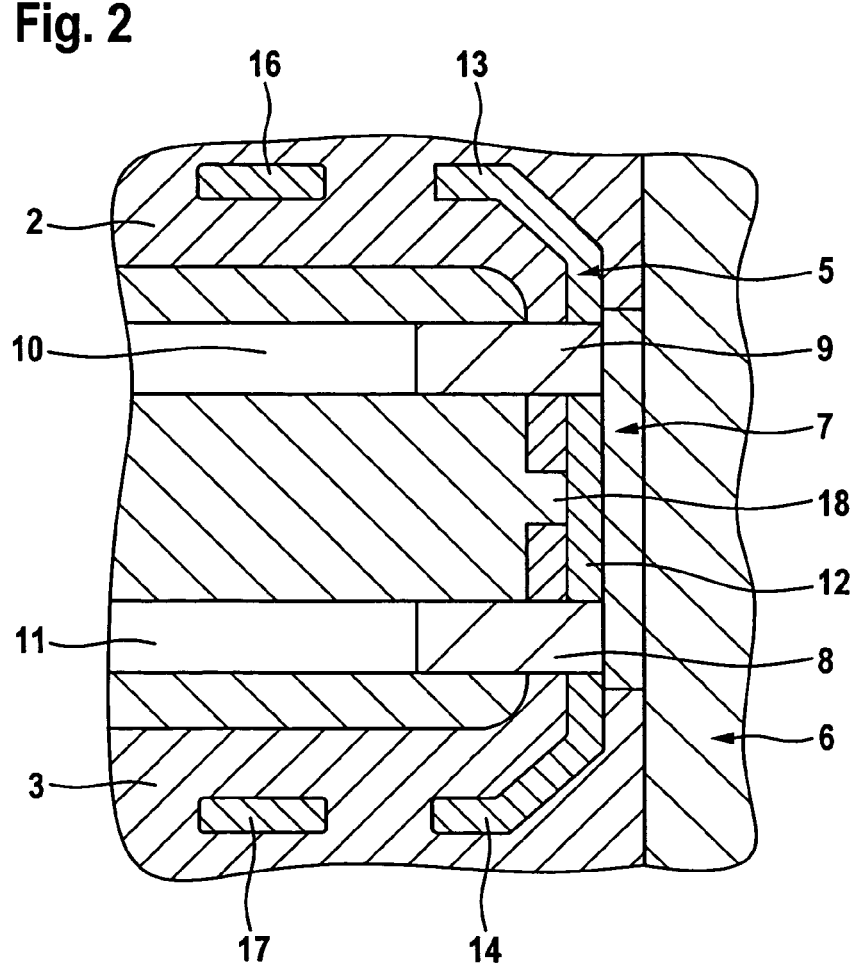
FIG. 2 is a fragmentary cross-sectional view of the guide device during production in a mold.

FIG. 2 shows an enlarged, fragmentary detail view of the guide device 1 as it is produced. Guide device 1 is located in a mold half 6 in which guide device 1 is produced. Before the production of guide device 1, connecting component 5 in the form of a metal strap 5 is attached to one of the mold halves 6. A magnet 7 is provided on mold half 6 for that purpose, with which connecting component 5 is held in a specific position before and during the injection process.

In addition, positioning pins 8, 9 are provided, which are held in respective recesses 10, 11. Positioning pins 8, 9 serve to align connecting component 5 correctly during the injection process when producing guide device 1. In addition to positioning pins 8, 9, a back rest 18 is also provided in mold half 6. As can be seen in FIG. 2, the transition between the base 12 of U-shaped connecting component 5 and the legs 13, 14 of U-shaped connecting component 5 is in the form of a reinforcement connection for stiffening.

Figure 3:
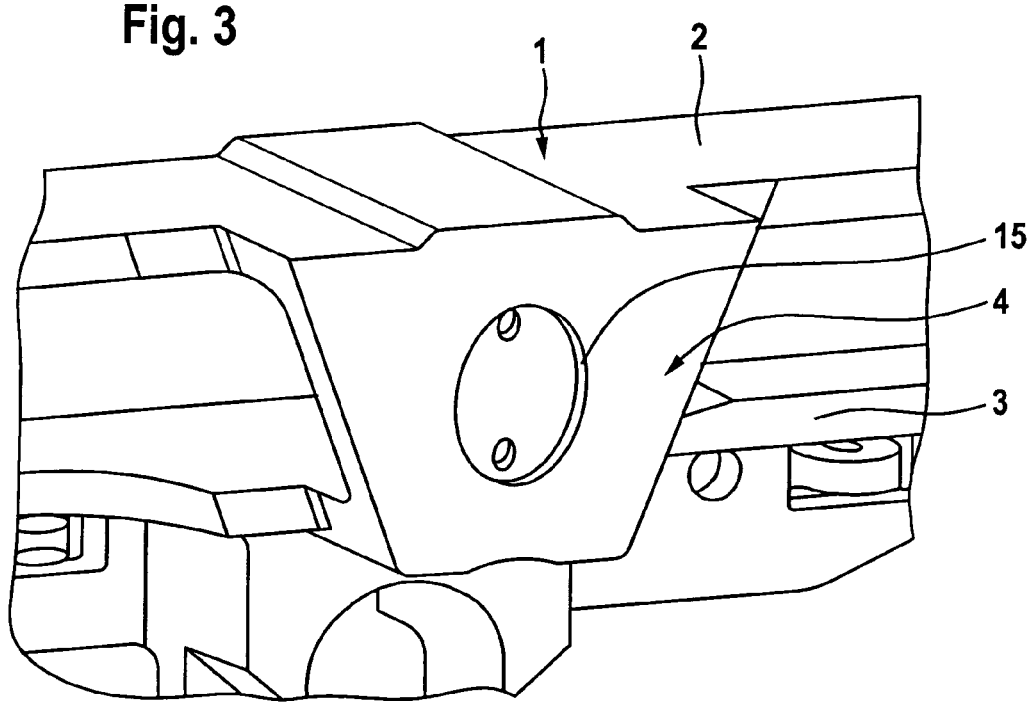
FIG. 3 is an enlarged, fragmentary perspective view of a portion of a guide device embodiment in accordance with the invention.

FIG. 3 shows an enlarged, fragmentary perspective view of a portion of the guide device 1 in accordance with the invention. In that view it can be seen that the channel-shaped connection region 4 has a substantially trapezoidal base region, which includes an oval-shaped recess 15 substantially at its center. The resulting elliptical shape of the edge region of recess 15 produces an optimal distribution of force at connection region 4, so that even with large temperature fluctuations no critical thermal stresses occur that can cause damage.

Figure 4:
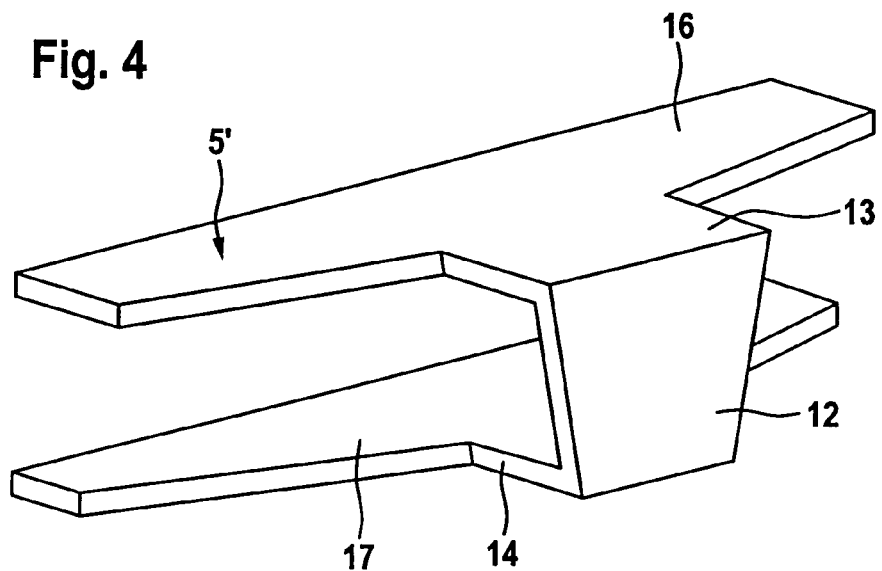
FIG. 4 is an enlarged perspective view of a connecting component to be integrated into the guide device.

FIG. 4 shows another embodiment of a connecting component, designated 5', which can be integrated into connection region 4 by injection-molding it in, for example. In that embodiment, the base 12 of connecting component 5' can be conformed with the shape of the channel-shaped connection region 4 shown in FIG. 3. The legs 13, 14 of U-shaped connecting component 5' can have extended crossing regions 16, 17 that are molded into the guide tongues 2, 3 during the injection-molding production of guide device 1, in order to achieve greater rigidity overall and optimal integration of connecting component 5' into guide device 1.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A guide device for guiding an endless torque-transmitting means, said guide device comprising: at least two corresponding elongated guide tongues defining opposed parallel and linear upper and lower guide surfaces that guide and engage respective upper and lower surfaces of the endless torque-transmitting means, wherein the upper and lower guide surfaces are spaced from each other at a predetermined distance to define therebetween a guide passageway between which a straight strand section of the endless torque-transmitting means is at least partially guided linearly for minimizing strand vibrations of the endless torque-transmitting means, wherein the guide tongues are each formed from a first material having a predetermined first coefficient of thermal expansion and are held so that their respective guide surfaces are at the predetermined distance from each other by an integrally-formed connection region of the first material that is positioned at a center region of the elongated guide tongues intermediate longitudinally outermost ends of each of the respective guide tongues, wherein the connection region is of substantially channel-like cross section having end sections integrally formed with respective ones of the guide tongues, wherein the connection region of the guide device includes a connecting component in the form of a U-shaped metal strap having a pair of spaced and substantially parallel legs that extend from a body region of the strap that is in contact with the connection region of the guide device, wherein the legs of the strap are connected to respective ones of the guide tongues, the metal strap having a predetermined second coefficient of thermal expansion that is lower than the first coefficient of thermal expansion of the first material for maintaining the guide surfaces of the guide device at the predetermined distance from each other so that during temperature changes the distance between the guide surfaces of the guide tongues is maintained substantially constant at the predetermined distance because of the lower coefficient of thermal expansion of the U-shaped metal strap, to thereby minimize reduction of the predetermined distance between the guide surfaces at low temperatures to minimize jamming of the endless torque-transmitting means between the respective guide surfaces of the guide device at low temperatures, and to minimize enlargement of the predetermined distance between the guide surfaces at high temperatures to minimize strand vibrations of the endless torque-transmitting means in directions toward and away from the respective upper and lower guide surfaces at high temperatures.

2. A guide device in accordance with claim 1, wherein the guide device is formed from a plastic material.

3. A guide device in accordance with claim 2, wherein the connecting component is at least partially integrated into the connection region of the guide device.

4. A guide device in accordance with claim 3, wherein the connecting component is integrated into the connection region of the guide device by molding.

5. A guide device in accordance with claim 2, wherein the connecting component is detachably connected to the connection region of the guide device.

6. A guide device in accordance with claim 5, wherein the connecting component is attached to the connection region of the guide device by means of a form-locking connection.

7. A guide device in accordance with claim 2, wherein the connecting component is formed from steel.

8. A guide device in accordance with claim 1, wherein dimensions of a base of the U-shaped metal strap correspond substantially to dimensions of the connection region.

9. A guide device in accordance with claim 1, wherein crossing regions are molded onto legs of the U-shaped metal strap.

10. A guide device in accordance with claim 9, wherein each crossing region is molded into a respective associated guide tongue.

11. A guide device in accordance with claim 1, wherein the metal strap is positioned substantially at the center of the connection region.

12. A guide device in accordance with claim 1, wherein the connection region includes a substantially oval-shaped recess.

13. A guide device in accordance with claim 1, wherein the guide device is formed from a high-temperature polyamide polymer.

14. A guide device in accordance with claim 1, wherein the endless torque-transmitting means is selected from the group consisting of a belt, a CVT chain, and a toothed chain.

* * * * *